United States Patent [19]

Wesson et al.

[11] 3,811,829

[45] May 21, 1974

[54] ISOTHERMAL BOAT CONTAINER

[75] Inventors: Richard A. Wesson, Phoenix, Ariz.; Sandford Platter, Bolton, Mass.

[73] Assignees: Semi, Inc., Phoenix, Ariz.; Robert L. Jarratt, Trustee in bankruptcy for Semiconductor Electronic Memories, Inc.

[22] Filed: Oct. 26, 1971

[21] Appl. No.: 192,052

[52] U.S. Cl. .......... 432/253, 432/11, 432/5, 432/261, 148/1.5

[51] Int. Cl. .......... F27b 9/00

[58] Field of Search .......... 263/47, 52, 48, 41, 42; 432/254.11, 261.5, 253; 148/1.5

[56] References Cited

UNITED STATES PATENTS

| | | | |
|---|---|---|---|
| 1,518,818 | 12/1924 | Rietz | 263/48 |
| 2,776,131 | 1/1957 | Marino, Jr. | 263/47 R |
| 2,947,114 | 8/1960 | Hill | 263/48 |
| 3,470,017 | 9/1969 | Rubin et al. | 263/48 |
| 3,604,694 | 9/1971 | Muller | 263/47 R |
| 3,619,839 | 11/1971 | Kraus et al. | 263/48 |
| 3,669,431 | 6/1972 | Lenss et al. | 263/47 R |

*Primary Examiner*—John J. Camby
*Assistant Examiner*—Henry C. Yuen
*Attorney, Agent, or Firm*—Lindenberg, Freilich & Wasserman

[57] ABSTRACT

In heat treating semiconductor circuits formed on wafers, the wafers are usually loaded into a boat and the boat is pushed into a diffusion furnace. This invention provides a container into which a boat is loaded and then pushed to the center of the furnace. The construction of the container is made such that the temperature gradient undergone by the semiconductor material is maintained below the value at which improper thermal stress is applied. Also, the temperature of the wafers in all locations of the boat is maintained substantially the same. As a result crystal damage is avoided.

5 Claims, 3 Drawing Figures

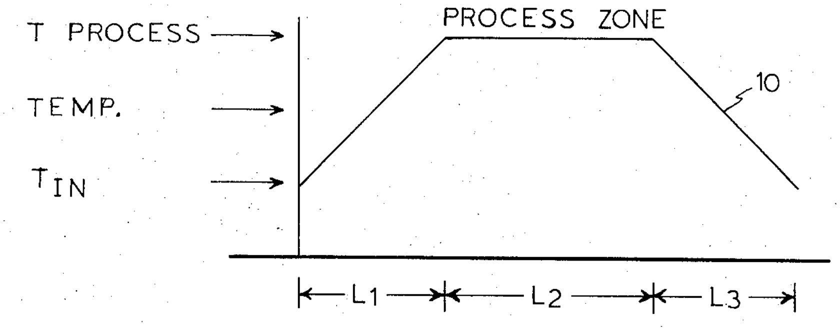
FIG. 1
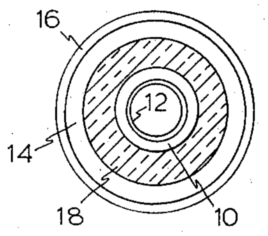
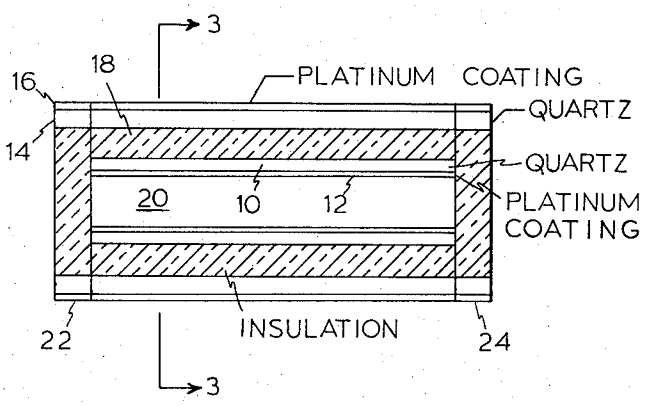
FIG. 3 FIG. 2
*INVENTORS*
SANDFORD PLATTER
RICHARD A. WESSON
*BY* Lindenberg, Freilich & Wasserman
ATTORNEYS

ISOTHERMAL BOAT CONTAINER

FIELD OF THE INVENTION

This invention relates to a method and means for heat treating semiconductor materials and more particularly to improvements therein.

In the fabrication of electrical circuits on semiconductor wafers, as part of the process, the wafers are heat treated by being pushed into a diffusion furnace wherein their temperature is elevated above 600°C. for a predetermined period of time. The actual processing temperatures may range on the order of 1,000°C. or 1,100°C., but the 600°C. temperature is that temperature at which the semiconductor wafer becomes plastic.

It has been found that when a semiconductor wafer exceeds its plastic temperature, if improper thermal stresses are created within the wafer as by improperly heating it, a large number of atomic dislocations occur which create defects in the structures on the wafer such that the number of rejected unusable circuits on a wafer is considerable.

In an application entitled "Heat Treating Process for Semiconductor Fabrication," by Sandford Platter and Charles F. Myers, which is assigned to a common assignee, Ser. No. 192,271, filed Oct. 26, 1971, now U.S. Pat. No. 3,723,053, there are described a number of methods and/or structures for controlling the temperature gradient in a semiconductor wafer above the plastic deformation temperature in a manner to avoid the defects created by thermal stresses.

Because of the temperature profile of a furnace, which effectively has a rising slope from either end toward the center of the furnace, when a boat which is loaded with semiconductor wafers is pushed into the furnace there is a difference in the temperature of all of the wafers. In a number of semiconductor processes, temperature of all of the wafers in a boat, especially above the critical temperature of 600°C. is required to be substantially the same.

OBJECTS AND BRIEF DESCRIPTION OF INVENTION

An object of this invention is to provide a container for a boat which maintains the contents thereof substantially isothermal.

Still another object of this invention is the provision of a container for a boat whereby harmful thermal stresses of semiconductor wafers contained in said boat above the plastic temperature are eliminated.

Yet, another object of this invention is the provision of a new and novel container for a boat used in semiconductor heat processing.

These and other objects of the invention are achieved in an arrangement wherein a container is fabricated which essentially comprises an outer cylinder of a highly reflective material, an inner cylinder of some high thermal conductivity material, and a filler between this inner and outer cylinder of a high temperature insulating material. The boat is placed within the container which is provided with end caps, except in the case where it is desired to pass a gas over the material being heated, in which event the ends of the container are elongated but open. The container is designed so that its interior heats up at a specified number of degrees C. per minute such that a critical temperature gradient does not result in the semiconductor wafers disposed in the boat. The container with the boat inside is pushed into the center of the furnace rapidly where it is allowed to stay until the internal temperature of the boat has risen to the desired processing temperature. The boat is then left in for as long as is required to be processed at that processing temperature. Thereafter the boat is removed and left near the entrance to the furnace or in some other region such that it can cool down at a rate which is less than that which causes damaging thermal stresses in the wafers above the plastic deformation temperature. The container insures that the temperature of all the wafers which are contained therein is substantially identical.

BRIEF DESCRIPTION OF THE DRAWINGS

FIG. 1 is a graph illustrating the heating profile of a diffusion furnace.

FIG. 2 is a cross sectional view of an isothermal container in accordance with this invention, and FIG. 3 is a view along the lines 3-3 of FIG. 2.

DESCRIPTION OF THE PREFERRED EMBODIMENTS

The graph representing the profile of a diffusion furnace in FIG. 1 shows a curve 10 which rises at the input to the furnace from an input temperature, at some rate determined by the construction of the furnace, to the processing temperature. There is a processing zone which occupies a distance designated as L2, over which the processing temperature is maintained. Thereafter, the temperature drops down to some lower value at the output end of the furnace over a distance L3.

In accordance with this invention, a container is provided, a cross-sectional view of which is shown in FIG. 2, into which a boat containing semiconductor wafers may be inserted. The container may comprise an inner cylinder 12 of an inert heat withstanding material, such as quartz, having a good thermal conductive coating 13 such as platinum, on the inside surface. An outer inert heat withstanding material cylinder 14, which again may be quartz, has a highly reflective coating 16, which also may be platinum. Between the two quartz cylinders is essentially the container wall 18, which may comprise a high temperature insulating material, such as zirconium oxide.

FIG. 3 is a cross-sectional view along the lines 3—3 of FIG. 2. A boat is placed within the central space 20 of the container. End caps 22, 24, are provided to eliminate end effects. When it is required to expose the material being heat treated to gases during the process of heat treatment, the end caps can be left off and the length of the container itself extended a distance at least four times the inner diameter of the insulating material beyond the boat ends.

In order to eliminate thermal stress in the semiconductor wafers, the boat containing the wafers to be processed is first placed into the container. The container with the boat inside is pushed into the process zone (L2) of the diffusion furnace at any reasonable speed limited by mechanical damage to furnace, container, boat and wafers. Thereafter, the time required for the inside of the container and the wafers to reach the process temperature is permitted to elapse. This can be determined either by the results of previous tests or by having a temperature transducer within the container which measures the temperature contained by the wafers. The heat processing of the wafer starts when they reach the processing temperature. At the completion of the processing time, the container is quickly removed from the diffusion furnace and placed in a constant temperature environment at some temperature below the critical temperature. This may be just outside the furnace entrance, for example. The time required for the contents of the container to reach the ambient temperature condition is permitted to elapse. This again may be measured by reading the temperature indicated by the transducer within the container. The wafers may be removed from the container at this time.

It should be noted that the design of the container is very critical from the standpoint that the semiconductor wafers within the container must not be permitted to rise to the processing temperature above the plastic temperature at such a rate that thermal stresses are applied thereto, nor must the semiconductor wafers be permitted to fall from the processing temperature at such a rate that thermal stresses are made to occur therein. The temperature change rate $(dT)/(dt)$ which must not be exceeded, or which may be considered the critical rate may be determined, empirically by actual measurements, or may be calculated by solving Poisson's equation for a particular type of material. Once this rate is known, then the container must be designed so that it heats up or cools down at a rate less than the critical rate. The higher the thermal time rate constant for the container, the lower the rate of change in the interior temperature thereof. This time rate constant is a function of the thermal conductivity (k), the density (p) the specific heat (Cp) of the container material, the dimensions of the container, and finally the resistance to heat passing through the surface of the container. Also, since the process temperatures are in the range of 1,000°C., the container material such as zirconium oxide must not transmit radiation in this range. The critical dimension is the thickness of the insulating wall. It should be further noted, that since the process temperature is high, the outer surface of the container is coated with a thin layer of material, such as platinum, that is highly reflective at that temperature. This gives a very high thermal resistance on the outer surface of the container. The inner layer of the container is also made of a high thermal conductivity material such as platinum. The low thermal resistance of the conductive path through the inner layer of platinum integrates any temperature variations along the length of the container and thus provide an isothermal container. To eliminate end effects, the high thermal conductivity liner should not reach more than 1 inch beyond the end of the wafer boat.

Given a process temperature, a maximum rate of change of temperature, i.e., $(d\ T)/(dt)$ and the inside dimension of the container, which is determined from the wafer size to be handled as well as the boat size, a container can be readily designed.

The quantity $d\,T/dt$ is mainly a function of the insulating material. Variations in the thermal time constant, and hence $d\,T/dt$ is a function of the thermal conductivity (k), density (p), specific heat (Cp) and the thickness of this layer. The thickness may be designated as RO–RI where RO is the outer diameter and RI is the inner diameter of the insulating material. Typical insulating material will have a low $k$, a high $p$, and a high $Cp$. Also it must take thermal shock. As the material $k$ goes up or $p$ and $Cp$ goes down, the thickness (RO–RI) must increase to maintain the proper $d\,T/dt$.

By way of illustration a container that will hold a 3 inch diameter wafer with a process temperature of 1,100°C. where $d\,T/dt = 50$°C. per minute, uses insulating material such as zirconium oxide, which has a $k$ of 0.2 BTU per hour-ft.²/ft.-°F.

$p = 150$ Ft/³

$Cp = 0.2$ BTU/Hr.

Wall thickness $R_o - R_i = 0.5$ inches

The zirconium oxide Ri is made large enough to enable a boat carrying the 0.3 inch diameter wafers to be inserted into the container is held between two platinum tubes, with the outer tube being 0.002 inches thick and the inner tube 0.010 inches thick. It should be noted that the quartz tubes may be omitted from this design. The quartz tubes serve the purpose of reducing the thickness of the platinum required since where the platinum does not have to be made self supporting, less of it is used and this makes the container less expensive. The platinum is not required to be self supporting when it is sprayed on a quartz cylinder.

The foregoing container should be at least $2R_i$ longer than the wafer boat and the boat should be centered in the container. End caps are provided, except in the case where gas must be passed through the container.

Since $d\,T/dt$ is mainly a function of the insulating material, then the calculation whereby the required thickness of the insulating material is determined for providing the desired $d\,T/dt$ within a tube of said material when exposed to a desired processing temperature, may be readily obtained from formulas given in books treating heat transfer, such as in a book by H. Schoock entitled, "Heat Transfer Engineering," published by Prentice Hall located in New Jersey.

There has accordingly been described hereinabove a novel and useful thermal lag container whereby the problem of crystal defects in semiconductor wafers, which occur as a result of heat treatment, is substantially eliminated.

What is claimed is:

1. In apparatus for heat treating semi-conductor wafers wherein said wafers are mounted in a boat and then pushed into a diffusion furnace for heat treatment, the improvement comprising:

a container within which said boat and said semiconductor wafers are placed, said container being movable with said boat through said furnace, said container having a center opening lined with a heat conductive material, a wall around said heat conductive material comprised of a heat insulating material, and an outer coating around said wall of heat insulating material comprised of a light reflecting material.

2. Apparatus as recited in claim 1 wherein the said heat conductive material and outer coating comprise platinum and said insulating material is zirconium oxide.

3. A container for use in the heat processing of semiconductor wafers comprising:

a cylinder of a heat insulating material having its thickness determined by the change of temperature with respect to time desired at the interior of said cylinder, said cylinder having an internal lining of a heat conductive material for integrating the heat which passes through said cylinder, an external surface of a light reflecting material, said semiconductor material being placed within said cylinder, and end caps for closing the open ends of said cylinder wall.

4. A container as recited in claim 3 wherein said heat insulating material is zirconium oxide, and said internal lining and external surface comprise platinum.

5. A container as recited in claim 3 wherein said internal lining and external surface comprise platinum coatings on quartz cylinders, and said heat insulating material between said quartz cylinders comprises zirconium oxide.

* * * * *